UNITED STATES PATENT OFFICE.

GEORGE R. SHERWOOD, OF KEARNEY, NEBRASKA.

MANUFACTURE OF FIBROUS PRODUCTS.

SPECIFICATION forming part of Letters Patent No. 680,079, dated August 6, 1901.

Application filed May 1, 1901. Serial No. 58,380. (No specimens.)

*To all whom it may concern:*

Be it known that I, GEORGE R. SHERWOOD, of the city of Kearney, county of Buffalo, and State of Nebraska, have invented a new and useful Process for the Manufacture of Fibrous Products, whereby I obtain a new and useful product, of which the following is a specification.

My invention relates to the manufacture of paper-stock and other fibrous products from the stalks of Indian corn and plants having a similar structure; and its object is to produce economically from such stalks a fibrous stock especially adapted for use in the manufacture of paper and other fibrous products, also for numerous uses to which paper-stock is applied—such, for instance, as the manufacture of wheels, dishes, and other receptacles.

I take the stalks of Indian corn or analogous plants having a pith enveloped in a fibrous shell, commonly known as plants of the cane species, such as sugar-cane and sorghum, and pass them through suitable mechanism, whereby the pith is cut, scraped, or otherwise mechanically severed from the fibrous shell or outer wall, then preferably cut, triturate, or grind the fibrous shell or outer wall (either with or without the leaves and husks) until reduced to a convenient size for the subsequent disintegrating process, then pass this product, from which the pith has been eliminated, (either immediately or when shipped to a convenient place for such treatment,) into a digester or boiler, where it is subjected to the usual chemical treatment for disintegration by dissolving or substantially dissolving the intercellular structure, so as to liberate the fibers. This dissolution I have satisfactorily effected by boiling in a caustic-soda solution of about four per cent. for a period of two hours under a pressure of about one hundred and fourteen pounds per square inch; also by boiling in a similar solution of about two per cent. for three and one-half hours at fifty-seven pounds pressure per square inch. Other suitable chemical solutions may be used, and the period of boiling and the amount of heat applied may be considerably varied. With increased heat or time less chemicals are required, and with a stronger solution the time or heat may be reduced. By applying sufficient heat or continuing the heat for a sufficient time the dissolution may be substantially, but less satisfactorily, effected by boiling in water without other chemical agents than those developed by the heat; but I prefer to use a chemical solution, which may be caustic soda or any chemical agent serving a similar purpose, many such agents being known in the art of manufacturing paper-stock. When the intercellular structure has been thus sufficiently dissolved, the fibrous product is separated by straining and washing or any suitable means and may then be used for the manufacture of paper, felting, or other articles. It furnishes an excellent fibrous paper-stock or felting adapted to the various purposes before mentioned and other analogous purposes. I find that while the shell of the cornstalk or maize affords a valuable paper-stock or felting material the pith if permitted to enter the boiler or digester with the shell obstructs the operation of dissolving the intercellular structure, and when boiled or otherwise dissolved with the fibrous constituents its presence injures the product as well as increases the expense of the operation and wastes the pith. It is impracticable to boil or dissolve it sufficiently to destroy the pith without injuring the fiber. By eliminating the pith through mechanical means before the boiling or dissolving process begins I greatly facilitate the operation and improve the product and at the same time reduce the cost of manufacture, practically making available for this purpose a valuable product which has been wasted. By separating the pith from the fibrous shell before it has been acted upon in the digester or boiler I save it as a valuable by-product for uses to which it is especially adapted, such as the manufacture of smokeless powder, cellulose packing, dynamite, oxalic acid, and linoleum, or for use as bedding for cattle, its celluar structure being especially adapted to take up and retain fertilizing elements.

The mechanical removal of the pith may be effected by means exhibited in certain patents heretofore granted me—for instance, United States Patent No. 627,882, granted me June 27, 1899, for "Machine for pithing stalks," or by improved mechanism upon which I am about to make application for Letters Patent, or by other suitable mechanical means. The stalks may be taken either when first cut or after they are partly or entirely dried or at any time before decay has unfitted them for use. While I prefer to reduce the fibrous portion by cutting, triturating, or grinding before boiling or chemical treatment, the product may pass to such treatment without further reduction than is incident to removing the pith. The separation of the pith from the shell may take place upon the farm before shipping the product to a convenient place for the further treatment or the successive treatments may be applied in immediate succession either on the farm or in the mill.

Having thus described my invention, what I claim as new, and desire to secure by Letters Patent, is—

1. The process of manufacturing a fibrous product from the stalks of Indian corn or analogous plants of the cane species, consisting of severing the pith from the shell by mechanical means before chemical treatment and thereafter dissolving the intercellular structure of the shell.

2. The improvement in the manufacture of fibrous products, consisting in removing the pith of Indian corn or analogous plants of the cane species from the shell by mechanical means before steeping or chemical treatment and thereafter dissolving the intercellular structure of the shell by boiling in a suitable chemical solution.

3. The improvement in the manufacture of fibrous products from Indian corn or analogous plants of the cane species, consisting in cutting the pith from the shell before chemical treatment, then chemically dissolving the intercellular structure of the shell and recovering the fibers therefrom, substantially as described.

4. The improved fibrous product composed of the fibers of Indian corn, or analogous plants of the cane species, from which the pith has been mechanically removed before chemical treatment, and the intercellular structure thereafter dissolved, substantially as described.

GEORGE R. SHERWOOD.

Witnesses:
ROBT. H. PARKINSON,
CHARLES L. HINE.